Nov. 9, 1926.                                                          1,606,064
H. EVANS
BOTTLE OR ARTICLE HOLDER
Filed July 3, 1923

Witness

Inventor
HAMLET EVANS
By Hazard and Miller
Attorneys

Patented Nov. 9, 1926.

UNITED STATES PATENT OFFICE.

HAMLET EVANS, OF LOS ANGELES, CALIFORNIA.

BOTTLE OR ARTICLE HOLDER.

Application filed July 3, 1923. Serial No. 649,279.

My present invention is a bottle or article holder, and it is an especial object of this invention to provide a simple, inexpensive and effective device adapted to hold milk bottles, or the like.

It being a common custom to deliver milk during early morning hours when householders ought not to be awakened to receive the same, it is an object of this invention to provide a holder which may be attached to a door or window jamb, or the like, to receive a bottle of milk, and a preferred embodiment of my invention is so constructed that, although it comprises resilient fingers between which the neck of a bottle of milk may be inserted, these fingers are so shaped as to render the fork formed thereby substantially self-closing, or pressure-closed in the sense that when a weight is applied, the fingers are thereby caused to move toward one another, tightly gripping the article by whose weight they may be depressed.

Although my holder is preferably so formed that the mentioned fork may optionally be swung into an elevated and inoperative position, in which it may be automatically held, my holder is not intended to be depressed below a substantially horizontal position, and, in a preferred embodiment of my invention, the holding means by which the mentioned fork is so retained may optionally be of such construction as to serve also for the retention of a milk ticket, or the like.

Although my present invention is especially suitable for the reception and retention of milk bottles, it will be understood that the principle of my holder is of broad application, and that embodiments of my invention may alternatively be used on other articles of a similar or dissimilar character.

Other objects of my invention will appear from the following description of a preferred embodiment thereof, and from the appended claims, taken in connection with the accompanying drawings, in which:

Referring in detail to the parts of that specific embodiment of my invention which I have chosen for purposes of illustration, 1 may be referred to as a securing plate, 2 being a holding fork pivoted thereto in any suitable manner, as by means of the pin 3.

The most interesting and important feature of my novel article holder being the holding fork 2. I point out specifically that this holding fork preferably consists of a single piece of resilient sheet metal, such as brass, so cut and bent as to form a comparatively rigid shank S, and a pair of strong but resilient fingers 4, shown as integral therewith and as curved or bowed outwardly in both a horizontal plane and a plane intersecting the horizontal, and as inclined outwardly and downwardly in such manner as to cause said fingers to move toward one another whenever they are depressed, as by means of a bottle, or the like, suspended therefrom.

Figure 3:
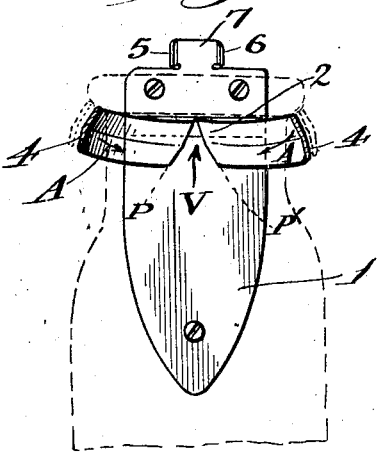
Fig. 3 is a transverse sectional view through the holding fork comprised in my bottle holder, a bottle neck being shown in dotted lines, and the approximate natural position of the holding fingers being also suggested in dotted lines.
Figure 2:
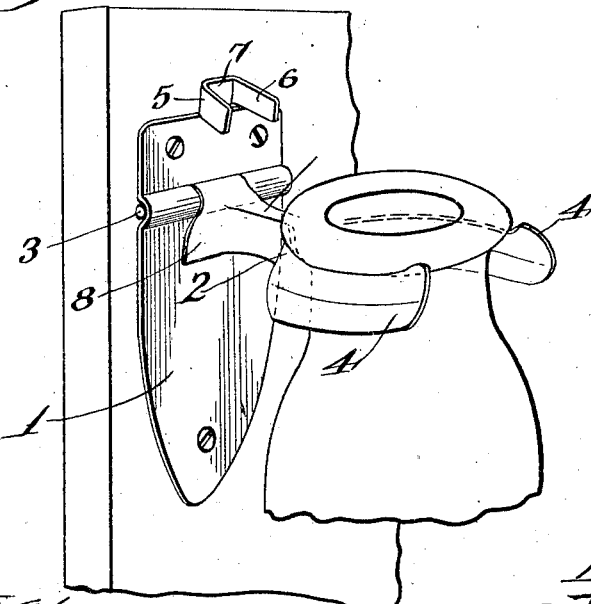
Fig. 2 is a similar view of my holder, showing the relative positions occupied by the parts when a bottle, or the like, is supported thereby.

The mentioned highly advantageous tendency of the fingers 4 of my self-closing holding fork to move diagonally and convergently under pressure, in such a manner as to grip any article by which they may be depressed, appears to be due to my employment of a shank S, having an inverted V-shaped cross section, as best shown at V in Figure 3, the resilient fingers 4 being connected therewith in such manner that each finger may be regarded as resiliently movable or pivoted upon a line P, P', marking the junction between the shank proper and each finger, so that, when depressed, each finger tends to move downwardly and inwardly in substantially the direction indicated by the arrows A, Figure 3, thereby securely gripping the neck of a bottle or a broom, or any similar article.

Figure 1:
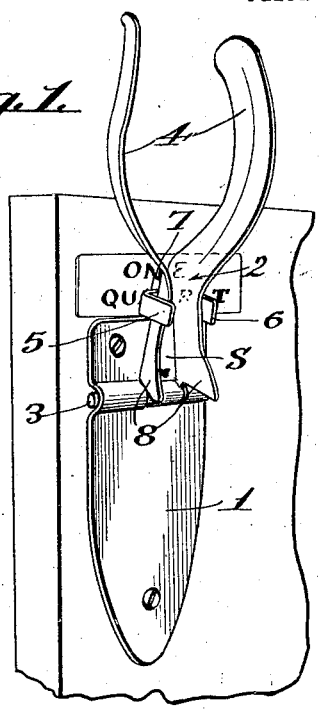
Figure 1 is a perspective view showing my holder, as the same might be applied to a door or window jamb, or the like, in an inoperative position, the holding fork thereof being swung up out of the way and releasably retained in its elevated position.

In order to releasably hold the fork 2 when out of use, I may optionally employ resilient means such as the keeper 5, shown as integral with plate 1 and as provided with side bosses 6 near its outer ends, to prevent the accidental or unintended release of the fork 2; and the body portion 7 of the resilient keeper 5 may also optionally be slightly offset relatively to the plane of the plate 1, in order to provide a resilient and wedge-bottomed retaining means for a milk ticket, or the like, in the manner suggested in Figure 1.

In order to prevent the fork 2 from being depressed below a substantially horizontal position, any suitable means may be employed, and I prefer to employ, for this purpose, the stops 8, shown as integral with the rigid shank S.

An important feature of the invention is in providing the spring fingers 4 with longitudinal creases, as shown on the drawing, which creases define top and bottom portions on the spring fingers which are inclined to one another. By having the top portions of the spring fingers inclined to the bottom portions, a truss effect is provided on the spring fingers, thereby stiffening them greatly as compared with spring fingers which are flat from top to bottom.

From the foregoing description, it will be obvious that I have devised a holder of simple and effective design, which may be easily and inexpensively formed from two pieces of sheet metal or the like, connected by a pivot pin; one of the mentioned pieces being adapted to serve as a securing plate carrying a resilient keeper, which may be utilized to hold a resilient fork in an elevated position and also to retain a milk ticket, or the like; and the other piece of sheet metal being so fashioned as to provide a pair of resilient fingers connected by a substantially rigid shank and integral with stop members which may prevent said fork from dropping below a substantially horizontal position, the fingers comprising said fork being so connected as to move toward one another in a highly advantageous and effective manner, when depressed.

Although I have herein described but one complete embodiment of my invention, it will be understood that various features thereof might be independently employed, and also that various modifications might be made therein without departure from the spirit and scope of my invention, as the same is indicated above and in the following claims.

What I claim is:

1. A bottle or article holder comprising a shank formed of sheet metal having a top portion and depending sides, and bowed resilient fingers forming continuations of said sides, said fingers being bent from said sides upon lines which are upwardly convergent, whereby when the fingers are depressed, they will move toward each other.

2. A bottle or article holder comprising a mounting plate, a shank formed of sheet metal having a top portion and depending sides hinged to said mounting plate, the rear edges of said sides providing stops engageable upon the mounting plate for limiting the downward movement of said shank relatively to the mounting plate, the forward ends of said sides being extended to provide a pair of spaced fingers, said fingers being longitudinally creased and bent from the planes of said sides upon lines which are upwardly convergent whereby when the fingers are depressed they will move towards each other.

In testimony whereof I have signed my name to this specification.

HAMLET EVANS.